(12) United States Patent
Frary

(10) Patent No.: US 9,829,083 B2
(45) Date of Patent: Nov. 28, 2017

(54) TWO-PASS MULTI-FUNCTION TORQUE CONVERTER WITH NORMALLY CLOSED IMPELLER CLUTCH

(71) Applicant: Schaeffler Technologies AG & Co. KG, Herzogenaurach (DE)

(72) Inventor: Matthew Frary, Burbank, OH (US)

(73) Assignee: Schaeffler Technologies AG & Co. Kg, Herzogenaurach (DE)

( * ) Notice: Subject to any disclaimer, the term of this patent is extended or adjusted under 35 U.S.C. 154(b) by 0 days.

(21) Appl. No.: 15/143,839

(22) Filed: May 2, 2016

(65) Prior Publication Data

US 2016/0245384 A1 Aug. 25, 2016

Related U.S. Application Data

(63) Continuation of application No. 14/458,851, filed on Aug. 13, 2014, now Pat. No. 9,353,844.

(60) Provisional application No. 61/868,876, filed on Aug. 22, 2013.

(51) Int. Cl.
*F16D 25/12* (2006.01)
*F16H 45/02* (2006.01)
*F16H 45/00* (2006.01)

(52) U.S. Cl.
CPC ............ *F16H 45/02* (2013.01); *F16D 25/12* (2013.01); *F16H 2045/002* (2013.01); *F16H 2045/0205* (2013.01); *F16H 2045/0215* (2013.01); *F16H 2045/0221* (2013.01); *F16H 2045/0257* (2013.01); *F16H 2045/0278* (2013.01)

(58) Field of Classification Search
CPC .... F16D 45/25; F16D 45/12; F16H 2045/002; F16H 2045/0205; F16H 2045/0215; F16H 2045/0226; F16H 2045/0247; F16H 2045/0278; F16H 2045/0257
See application file for complete search history.

(56) References Cited

U.S. PATENT DOCUMENTS 4,143,561 A * 3/1979 Melhorn ................ F16F 15/129
192/214.1
4,194,604 A * 3/1980 Nichols ................... F16H 45/02
192/3.26

(Continued)

*Primary Examiner* — Ramya Burgess
*Assistant Examiner* — Tinh Dang
(74) *Attorney, Agent, or Firm* — LeKeisha M. Suggs

(57) ABSTRACT

A multi-function torque converter, comprising: a cover rotatable about a rotational axis and comprising opposite first and second sidewalls, the cover further comprising an outer wall extending between and interconnecting the opposite sidewalls; an impeller coaxially aligned with the rotational axis and comprising an impeller shell; a backing plate extending radially inward from and non-rotatable relative to the outer wall of the cover and being spaced between the opposite sidewalls of the cover, the backing plate having a first engagement surface; and, a turbine-piston coaxially aligned with and hydrodynamically drivable by the impeller, the turbine-piston comprising a turbine shell including a radial extension having a second engagement surface axially movable toward and away from the first engagement surface of the backing plate to position the torque converter into and out of a lockup mode in which the turbine-piston is mechanically locked to and non-rotatable relative to the backing plate.

8 Claims, 7 Drawing Sheets

(56) References Cited

U.S. PATENT DOCUMENTS

| | | | | |
|---|---|---|---|---|
| 4,199,047 | A * | 4/1980 | Ling | F16H 45/02 |
| | | | | 192/3.3 |
| 5,695,028 | A | 12/1997 | Fukushima | |
| 7,445,099 | B2 * | 11/2008 | Maucher | F16D 47/06 |
| | | | | 192/3.26 |
| 7,980,992 | B2 | 7/2011 | Sturgin | |
| 9,297,448 | B1 * | 3/2016 | Depraete | F16H 45/02 |
| 2004/0188208 | A1 | 9/2004 | Leber | |
| 2004/0216971 | A1 | 11/2004 | Johann et al. | |
| 2007/0074943 | A1 | 4/2007 | Hemphill et al. | |
| 2008/0000745 | A1 * | 1/2008 | Swank | F16H 45/02 |
| | | | | 192/3.29 |
| 2009/0014269 | A1 | 1/2009 | Ari et al. | |
| 2009/0127050 | A1 | 5/2009 | Ari et al. | |
| 2009/0157272 | A1 | 6/2009 | Uhler et al. | |
| 2013/0140122 | A1 | 6/2013 | Hemphill et al. | |
| 2015/0021137 | A1 | 1/2015 | Lindemann et al. | |

* cited by examiner

TWO-PASS MULTI-FUNCTION TORQUE CONVERTER WITH NORMALLY CLOSED IMPELLER CLUTCH

TECHNICAL FIELD

The present disclosure relates to a two-pass multi-function torque converter with a normally closed impeller clutch, in particular, an impeller clutch with a resilient element urging the impeller clutch to a closed position.

BACKGROUND

Multi-function torque converters include an impeller clutch to non-rotatably connect an impeller to a cover for the torque converter, and a torque converter clutch to bypass a turbine. It is known to close the impeller clutch and then to close the torque converter clutch in series. For example, the same fluid circuit can be used to provide apply pressure to close both the impeller clutch and the torque converter clutch. However, this process reduces the pressure bandwidth for both clutches. Further, the torque converter clutch apply pressure for known multi-function torque converters can be higher than in a conventional torque converter when the impeller clutch apply pressure opposes the torque converter clutch apply pressure. As a result, there is a need for higher pressure in the circuit and increased pump capacity, and efficiency of the hydraulic system decreases. In addition, apply pressure must be maintained for the impeller clutch to keep the impeller clutch closed to maintain the function of the torque converter, further increasing the energy requirement for the hydraulic system.

SUMMARY

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; and an impeller clutch including a resilient element urging the impeller shell toward the cover to close the impeller clutch and including at least a portion located radially inward of the at least one impeller blade.

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; a first pressure chamber including a torus at least partially formed by the turbine and impeller shells; and an impeller clutch including a resilient element urging the impeller shell in a first axial direction to close the impeller clutch and including at least a portion located radially inward of the at least one impeller blade. Fluid pressure in the first pressure chamber is arranged to displace the impeller shell in a second axial direction, opposite the first axial direction, to an open position in which the impeller shell is rotatable with respect to the cover.

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; a torque converter clutch including an axially displaceable piston; a first pressure chamber at least partially formed by the cover and the impeller shell; a second pressure chamber at least partially formed by the cover, the turbine shell, and the impeller shell; a third pressure chamber at least partially formed by the cover and the axially displaceable piston; a first fluid circuit providing pressurized fluid to the first pressure chamber; a second fluid circuit, separate from the first fluid circuit, providing pressurized fluid to the third pressure chamber; a passive fluid circuit arranged to drain fluid from the second chamber; and an impeller clutch including a resilient element located in the first pressure chamber, urging the impeller shell in a first axial direction to close the impeller clutch to connect the impeller shell to the cover, and including at least a portion located radially inward of the at least one impeller blade. Fluid pressure in the second pressure chamber is arranged to displace the impeller shell in a second axial direction, opposite the first axial direction, to open the impeller clutch, and displace the axially displaceable piston in the first axial direction to close the torque converter clutch to connect the cover to the turbine shell. Fluid pressure in the third pressure chamber is arranged to displace the axially displaceable piston in the second axial direction to open the torque converter clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
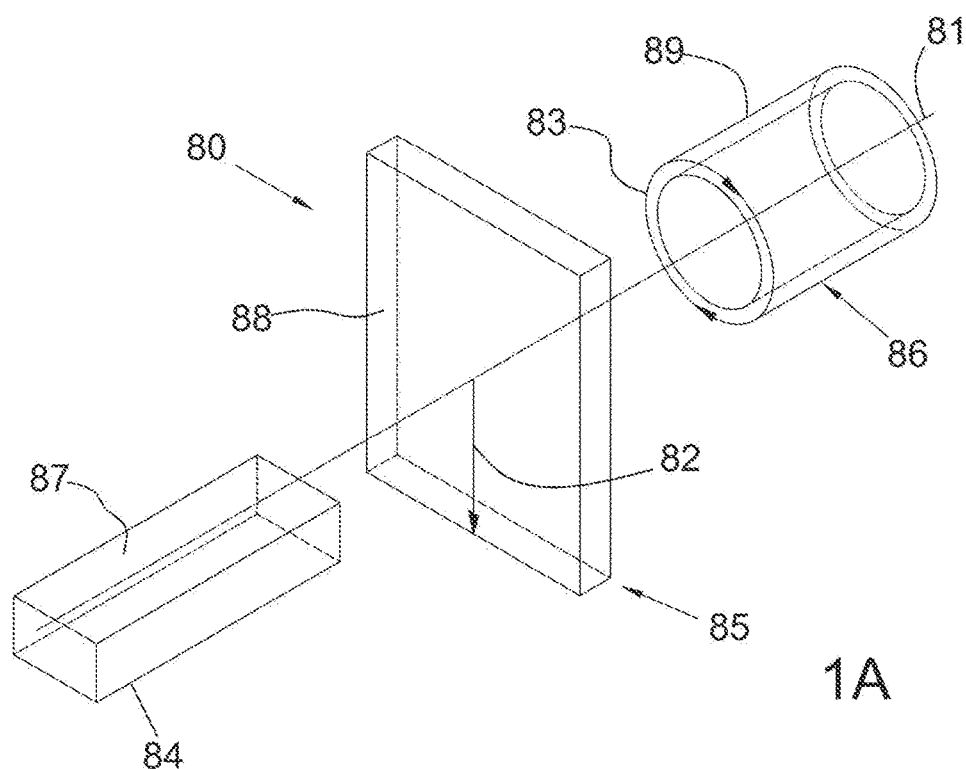
FIG. 1A is a perspective view of a cylindrical coordinate system demonstrating spatial terminology used in the present application.
FIG. 1B is a perspective view of an object in the cylindrical coordinate system of FIG. 1A demonstrating spatial terminology used in the present application.
Figure 1:
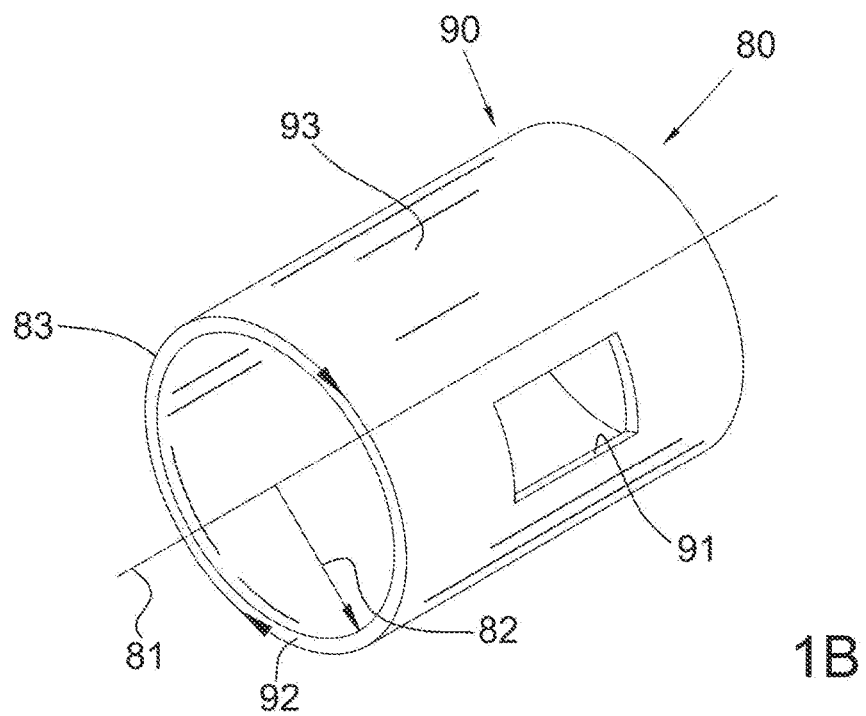

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
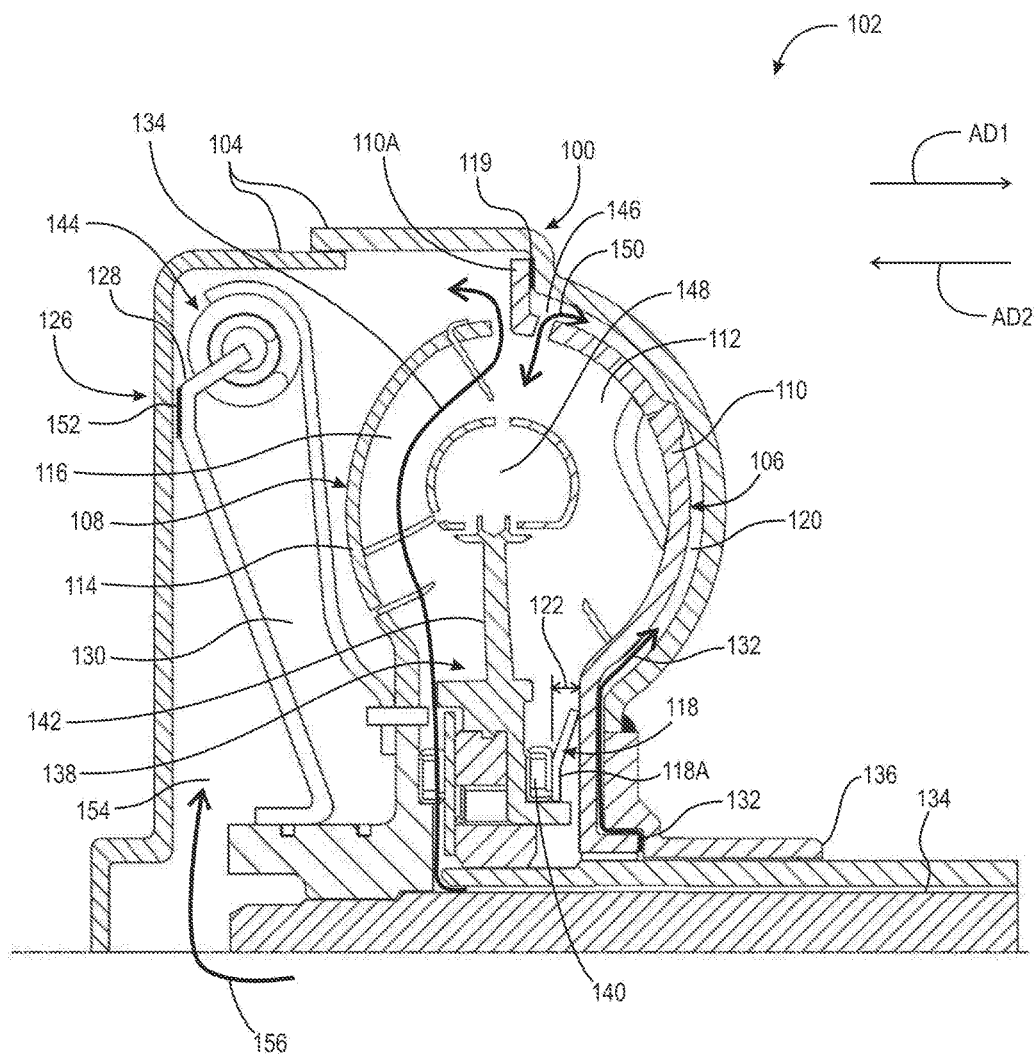
FIG. 2 is partial cross-sectional view of a multi-function torque converter with a normally closed impeller clutch in a closed position.

FIG. 2 is partial cross-sectional view of a multi-function torque converter, or hydrokinetic torque coupling device for coupling a driving shaft and a driven shaft together, with normally closed impeller clutch 100 in a closed position.

Figure 3:
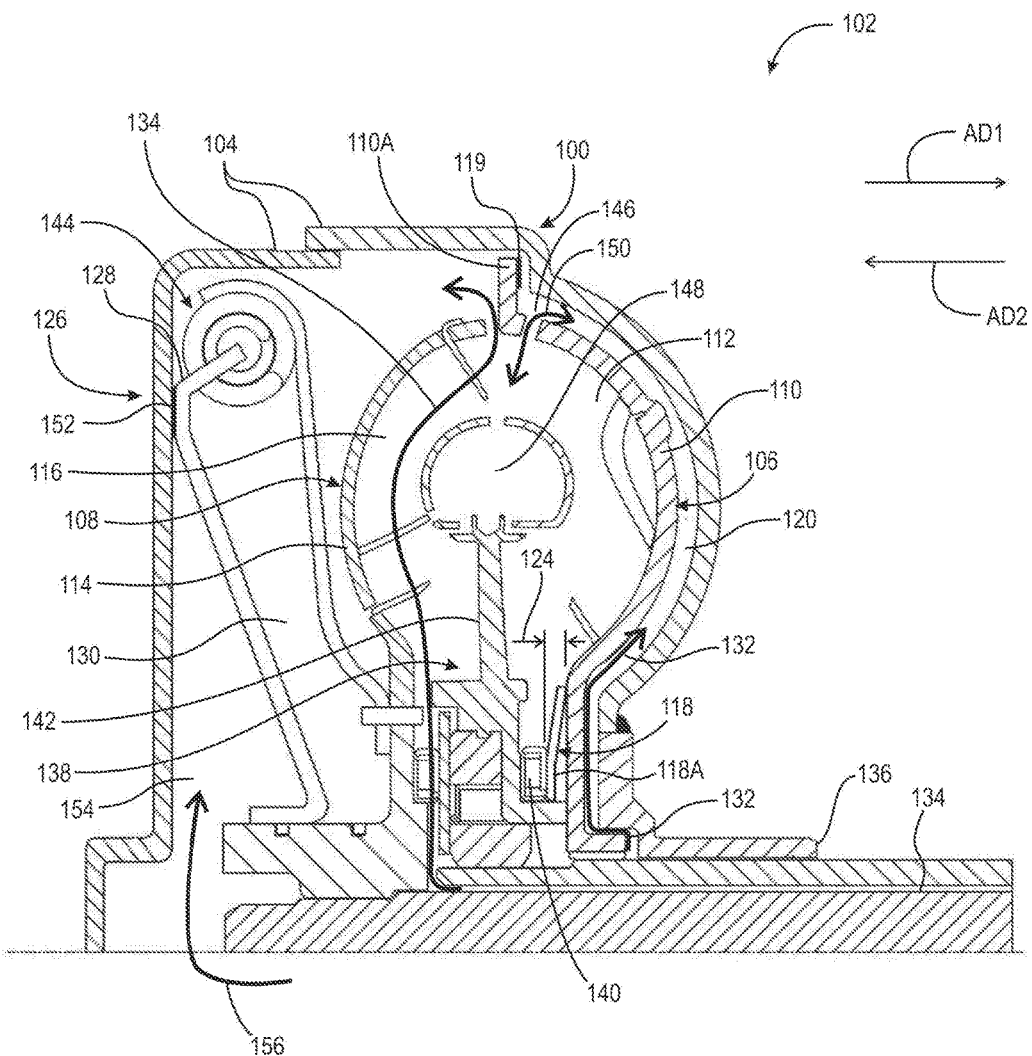
FIG. 3 is partial cross-sectional view of the multi-function torque converter of FIG. 2 with the normally closed impeller clutch in an open position.

FIG. 3 is partial cross-sectional view of the multi-function torque converter of FIG. 2 with normally closed impeller clutch 100 in an open position. The following should be viewed in light of FIGS. 2 and 3. Multi-function torque converter 102 includes cover 104 arranged to receive torque from a prime mover such as an engine, for example, impeller 106, and turbine 108. Impeller 106 includes impeller shell 110, and at least one impeller blade 112 connected to the impeller shell. Turbine 106 includes turbine shell 114 and at least one turbine blade 116 connected to the turbine shell. Clutch 100 includes resilient element 118 and friction material 119. Element 118 urges the impeller shell into a closed position non-rotatably connecting impeller shell 110, friction material 119, and cover 104. Element 118 includes portion 118A located radially inward of impeller blade 112.

In an example embodiment, torque converter 102 includes pressure chamber 120 at least partially formed by cover 104 and impeller shell 110. Resilient element 118 urges impeller shell 118 in axial direction AD1 away from turbine shell 114 to close clutch 100. Fluid pressure in pressure chamber 120 is arranged to displace the impeller shell in axial direction AD2, opposite the axial direction AD1, to axially compress the resilient element (reduce axial extent 122 of the resilient element) to an open position for clutch 100 in which impeller shell 110 is rotatable with respect to the cover.

Figure 4:
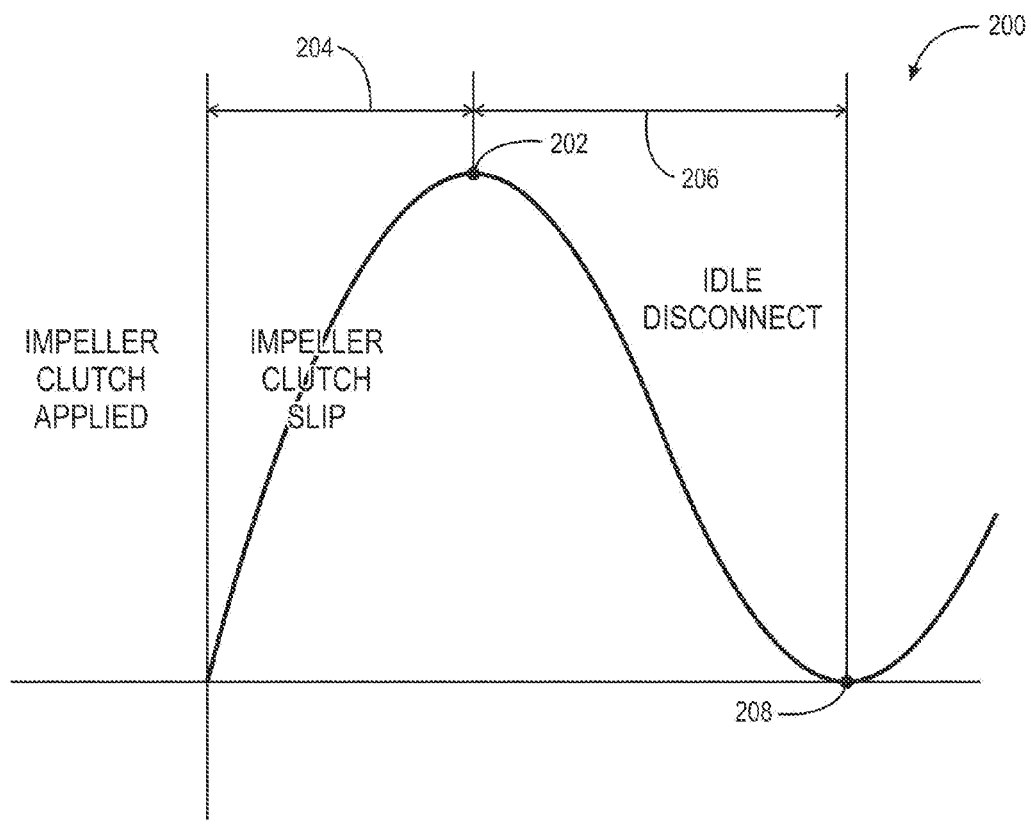
FIG. 4 illustrates a load-deflection curve for a bi-stable resilient element.

FIG. 4 illustrates load-deflection curve 200 for a bi-stable resilient element. The following should be viewed in light of FIGS. 2 through 4. The X axis for curve 200 is travel, or axial compression for element 118. The Y axis for curve 200 is force applied by element 118 on the impeller shell. In an example embodiment, element 118 is a diaphragm spring or a bi-stable resilient element. When torque converter 102 is assembled, element 118 is compressed, or preloaded, to a point in region 204 near point 202. To transition from the closed position to the open position for the clutch shown in FIG. 3, the fluid pressure in chamber 120 is increased from a first magnitude to a second magnitude to progressively displace the impeller shell in axial direction AD2 to progressively axially compress the resilient element to an intermediate axial extent (analogous to point 202 on curve 200) between axial extent 112 shown in FIG. 2 and axial extent 124 shown in FIG. 3. The resilient element exerts a progressively greater force, in axial direction AD1, on the impeller shell as element 118 is compressed. This is analogous to region 204 of curve 200. The pressure in chamber 120 continues to displace the impeller shell in direction AD2 to compress element 118 past the intermediate extent. At that point element 118 exerts less force in the axial direction AD1 (entering region 206 of curve 200) as element 118 is further compressed. Since progressively less force is required to compress element 118 in region 206, as element 118 enters region 206, the fluid pressure can be decreased from the second magnitude to a third magnitude. The fluid pressure continues to progressively displace the impeller shell in axial direction AD2, and the force exerted by the resilient element in axial direction AD1 on the impeller shell continues to decrease. When the third magnitude is approximately equal to the first magnitude (point 208), relatively low pressure is required to hold element 118 in a compressed position with clutch 100 open as shown in FIG. 3.

In an example embodiment, the multi-function torque converter includes torque converter clutch 126 with piston 128 and pressure chamber 130 at least partially formed by the turbine shell. Clutch 126 is arranged to connect the cover to the turbine shell and by-pass the impeller shell. That is, torque flows from the cover to the turbine shell through the torque converter clutch without passing through the impeller shell. Fluid circuit 132 is arranged to provide pressurized fluid to pressure chamber 120 to displace the impeller shell to open clutch 100 such that the impeller shell is rotatable with respect to the cover. Fluid circuit 134 is arranged to provide pressurized fluid to pressure chamber 130 to close the torque converter clutch to connect the cover to the turbine shell.

Advantageously, circuit 134 is the only fluid circuit in the torque converter used in the closing of the impeller clutch and the torque converter clutch. Specifically, since element 118 is used to close impeller clutch 100, it is not necessary to supply pressurized fluid to close clutch 100. Thus, the pressure bandwidth problem and the efficiency and energy requirement problems for the hydraulic system, noted above, are eliminated.

In an example embodiment, the multi-function torque converter includes pump hub 136 non-rotatably connected to the cover and arranged to engage and drive a pump for a transmission. At least a portion of the resilient element is axially disposed between the impeller shell and the pump hub.

In an example embodiment, the multi-function torque converter includes stator 138 and bearing 140. Stator 138 is axially located between the turbine and the impeller and includes at least one stator blade 142. At least portion 118A of the resilient element is axially located between the stator and the impeller shell. In an example embodiment, element 118 reacts against bearing 140 to urge the impeller shell in direction AD1. In an example embodiment, the multi-function torque converter includes vibration damper 144.

In an example embodiment, the impeller shell includes passageway 146 through the material forming the impeller shell, wholly surrounded by the material, and opening to pressure chamber 120 and torus 148 formed by the impeller and the turbine. Passageway 146 provides flow path 150 between the torus and the pressure chamber.

In torque converter mode (clutch 100 is closed and clutch 126 is open), fluid pressure in circuit 132 and chamber 120 is low, fluid pressure in circuit 134 and chamber 130 is substantial equal to zero or is negative, and element 118 urges the impeller shell in direction AD1 to close clutch 100. Flow in flow path 150 is from chamber 120 to the torus for cooling purposes.

To close clutch 127 for torque converter clutch mode, fluid pressure in circuit 134 and chamber 130 is increased to a high value to non-rotatably engage piston 128, friction material 152, and cover 104. Clutch 100 remains closed and flow in flow path 150 is from the torus to chamber 120 for cooling purposes. In idle disconnect mode (clutches 100 and 127 each open), pressure in fluid circuit 132 and chamber 120 is increased to a high value to open clutch 100, and fluid pressure in circuit 134 and chamber 130 is decreased to zero or a negative value, opening clutch 126. Flow in flow path 150 is from chamber 120 to the torus for cooling purposes. Fluid also flows between extension 110A and the cover into chamber 130. To open clutch 126, fluid pressure in chamber 154 is increased via fluid circuit 156. Fluid pressure in chamber 154 and circuit 156 is decreased to close clutch 126.

Figure 5:
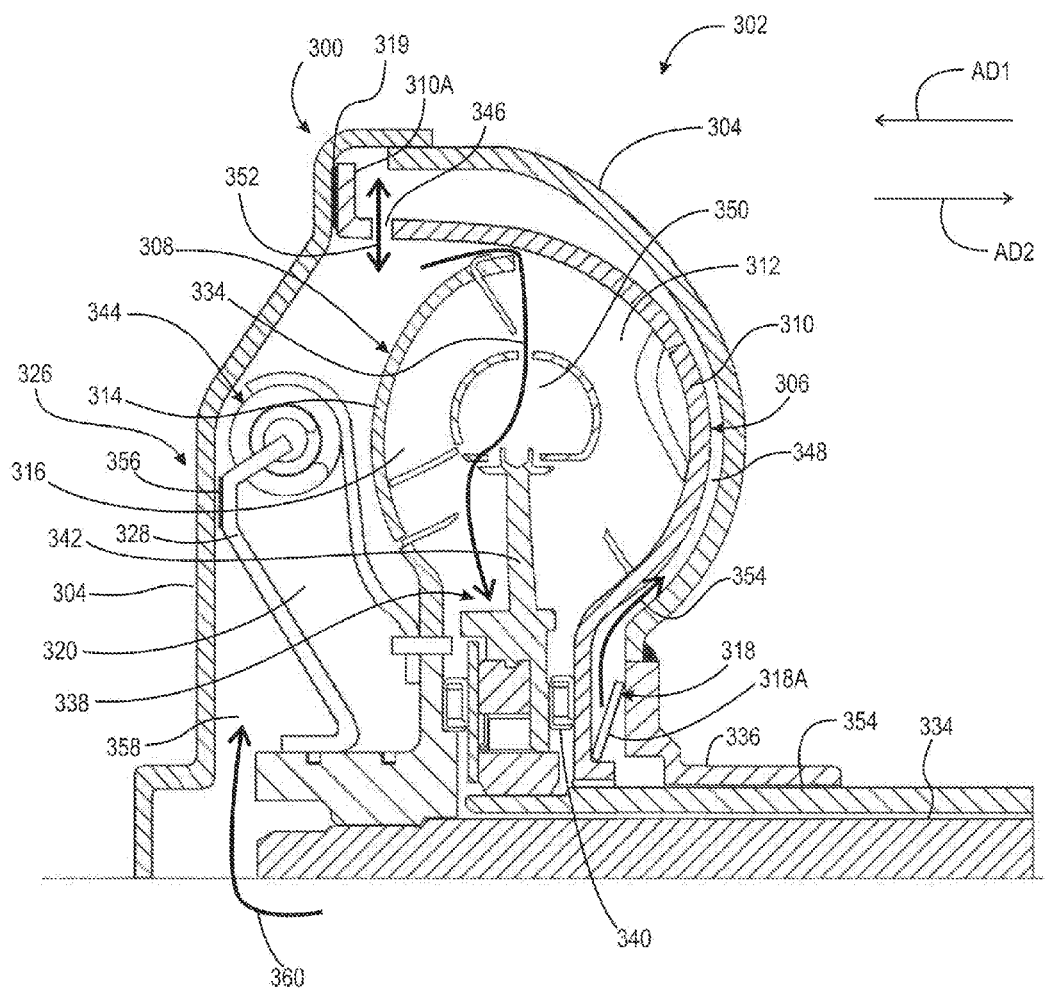
FIG. 5 is partial cross-sectional view of a multi-function torque converter with a normally closed impeller clutch in a closed position.

FIG. 5 is partial cross-sectional view of a multi-function torque converter with normally closed impeller clutch 300 in an open position.

Figure 6:
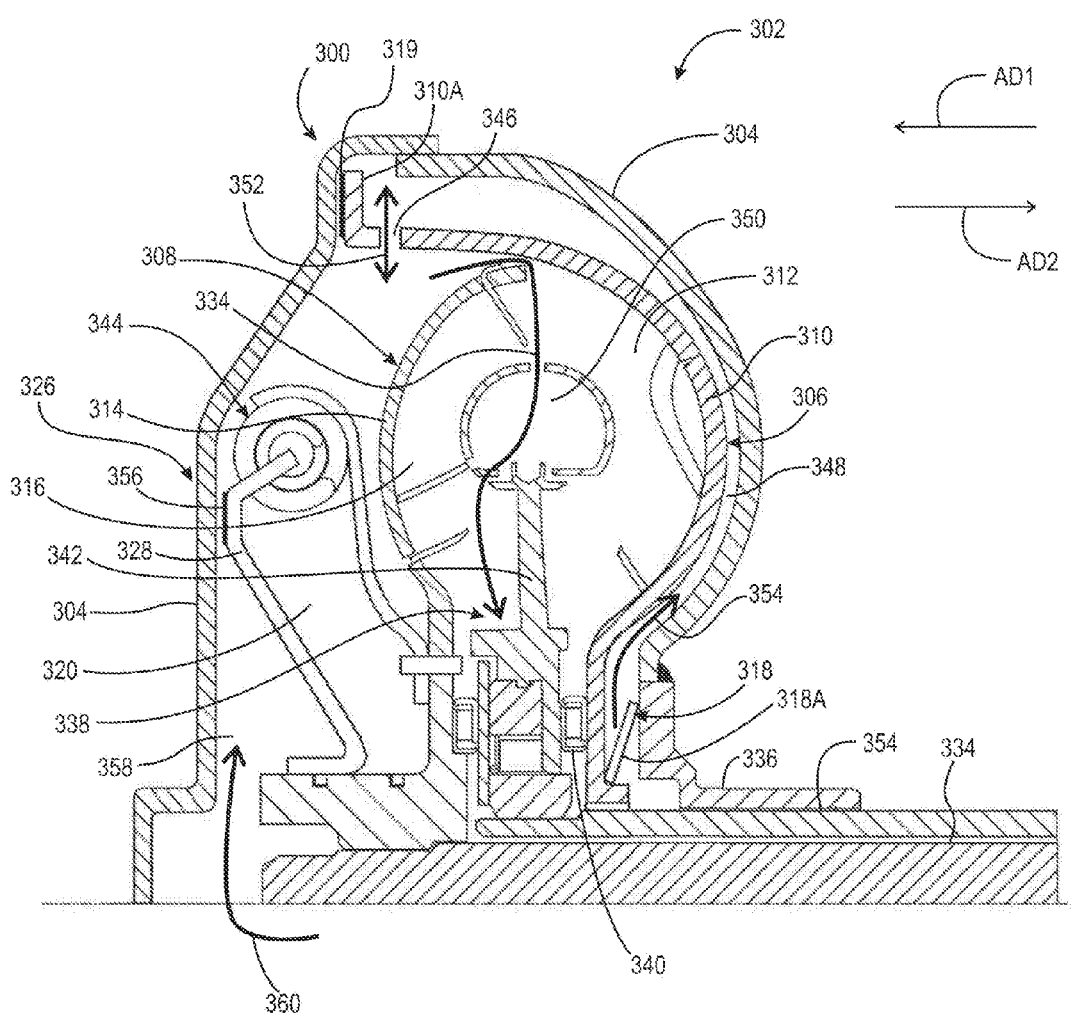
FIG. 6 is partial cross-sectional view of the multi-function torque converter of FIG. 5 with the normally closed impeller clutch in a open position; and, FIG. 7 is partial cross-sectional view of a multi-function torque converter, with a normally closed impeller clutch, in an idle mode.

FIG. 6 is partial cross-sectional view of the multi-function torque converter of FIG. 5 with normally closed impeller clutch 300 in a closed position. Multi-function torque converter 302 includes cover 304 arranged to receive torque from a prime mover, impeller 306, and turbine 308. Impeller 306 includes impeller shell 310, and at least one impeller blade 312 connected to the impeller shell. Turbine 306 includes turbine shell 314 and at least one turbine blade 316 connected to the turbine shell. Clutch 300 includes resilient element 318 and friction material 319. Element 318 urges the impeller shell into a closed position connecting impeller shell 310 with cover 304. The connection between impeller shell 310 and cover 304 is substantially non-rotatable; however, it should be understood that some slip may occur between shell 310 and cover 304 when the impeller clutch is closed. Element 318 includes portion 318A located radially inward of impeller blade 312.

Resilient element 318 urges impeller shell 318 in axial direction AD1 toward turbine shell 314 to close 300. In an example embodiment, torque converter 302 includes chamber 320 at least partially formed by the cover, the turbine shell, and the impeller shell. Fluid pressure in pressure chamber 320 is arranged to displace the impeller shell in axial direction AD2, opposite the axial direction AD1, to an open position for clutch 300 in which impeller shell 310 is rotatable with respect to the cover.

In an example embodiment, element 318 is a diaphragm spring or a bi-stable resilient element. The discussion regarding 218 as a bi-stable resilient element is applicable to element 318.

In an example embodiment, the multi-function torque converter includes torque converter clutch 326 with axially displaceable piston 328. Clutch 326 is arranged to connect the cover to the turbine shell and by-pass the impeller shell. That is, torque flows from the cover to the turbine shell through the torque converter clutch without passing through the impeller shell. The connection between piston 328 and cover 304 is substantially non-rotatable; however, it should be understood that some slip may occur between piston 328 and cover 304 when the torque converter clutch is closed. Fluid circuit 360 is arranged to provide pressurized fluid to pressure chamber 320 to displace the impeller shell to open clutch 300 such that the impeller shell is rotatable with respect to the cover, and to pressure chamber 358 to displace piston 328 to open clutch 326 such that the turbine shell is rotatable with respect to the cover. Fluid circuit 354 is arranged to provide pressurized fluid to pressure chamber 320 through chamber 348, at least partially formed by shell 310 and cover 304, and passageway 346 to close the torque converter clutch to connect the cover to the turbine shell. Passageway 346 is through the material forming the impeller shell and wholly surrounded by the material.

Advantageously, circuit 354 is the only fluid circuit in the torque converter used in the closing of the impeller clutch and torque converter clutches. Specifically, since element 318 is used to close impeller clutch 300, it is not necessary to supply pressurized fluid to close clutch 300. Thus, the pressure bandwidth problem and the efficiency and energy requirement problems for the hydraulic system, noted above, are eliminated.

In an example embodiment, the multi-function torque converter includes pump hub 336 non-rotatably connected to the cover and arranged to engage and drive a pump for a transmission. At least a portion of the resilient element is axially disposed between the impeller shell and the pump hub. Element 318 reacts against the pump hub to urge the impeller shell in direction AD1. That is, element 318 is located in chamber 348 described below.

In an example embodiment, the multi-function torque converter includes stator 338 axially located between the turbine and the impeller and including bearing 340 and at least one stator blade 342. At least portion 318A of the resilient element is axially located between bearing 340 and the impeller shell. In an example embodiment, the multi-function torque converter includes vibration damper 344. Friction material 319 is axially disposed between the cover and the impeller shell and radially aligned with the turbine shell or the vibration damper.

In an example embodiment, chamber 320 which includes torus 350, at least partially formed by shells 310 and 314. Passageway 346 provides flow path 352 between pressure chamber 348 and torus 350.

In torque converter mode (clutch 300 is closed and clutch 326 is open), fluid pressure in circuit 354, chamber 348, and chamber 320, is low, and element 318 urges clutch 300 closed. To close clutch 326 for torque converter clutch mode, fluid pressure in circuit 354 and chamber 348 is increased, increasing fluid pressure in chamber 320 through flow path 352 in passage 346 to a high value to engage piston 328, friction material 356 for clutch 326, and cover 304.

Clutch 300 remains closed. In idle disconnect mode (clutches 300 and 326 each open), pressure in fluid circuit 360 and chamber 358 is increased to a high value to open clutch 300 and clutch 326. That is, to open clutch 326, fluid pressure in chamber 358 is increased via fluid circuit 360. Fluid flows from chamber 348 to chamber 320. Fluid drains from chamber 320 and torus 350 via passive fluid circuit 334. To re-close clutch 326, fluid pressure in chamber 358 and circuit 360 is decreased, and/or fluid pressure in chamber 320 and circuit 354 is increased.

Figure 7:
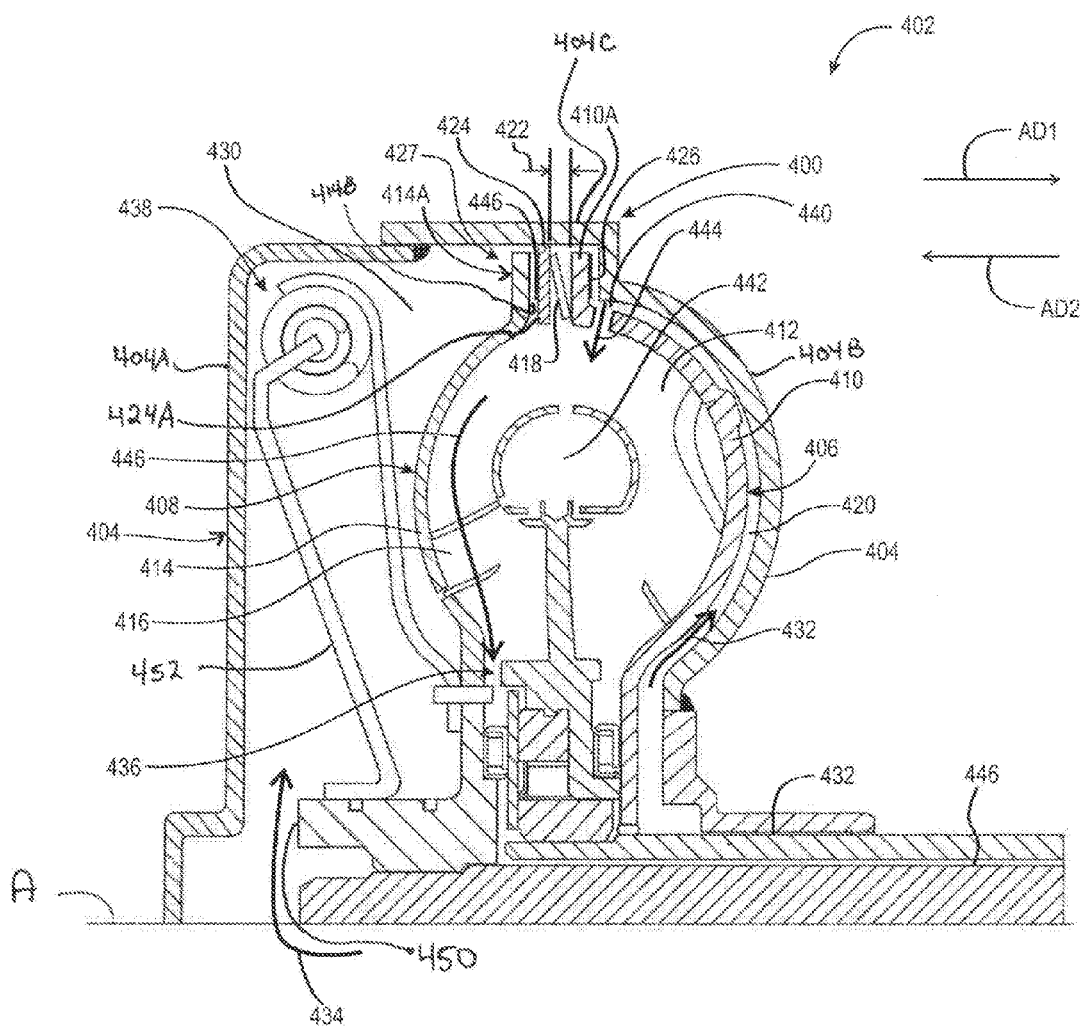

FIG. 7 is partial cross-sectional view of a multi-function torque converter, with normally closed impeller clutch 400, in an idle mode. By "idle mode" we mean both clutch 400 and a torque converter clutch are open. Multi-function torque converter or hydrokinetic torque coupling device 402 includes cover or casing 404 arranged to receive torque from a prime mover, impeller 406, turbine 408, and axis of rotation or rotational axis A. Cover or casing 404 includes opposite first and second sidewalls 404A and 404B, further includes outer wall 404C extending between and interconnecting the opposite sidewalls. Impeller 406 is coaxially aligned with the rotational axis A and includes impeller shell 410, and at least one impeller blade 412 connected to the impeller shell 410. Turbine 406 includes turbine shell 414 and at least one turbine blade 416 connected to the turbine shell. Clutch 400 includes resilient element 418 urging the impeller shell into a closed position connecting impeller shell 410 with cover 404. The connection between impeller shell 410 and cover 404 is substantially non-rotatable; however, it should be understood that some slip may occur between shell 410 and cover 404 when the impeller clutch is closed. Element 418 is located radially outward of blades 412 and 416.

In an example embodiment, torque converter 402 includes pressure chamber 420 at least partially formed by cover 404 and impeller shell 410. Resilient element 418 urges impeller shell 418 in axial direction AD1 away from turbine shell 414 to close clutch 400. Fluid pressure in pressure chamber 420 is arranged to displace the impeller shell in axial direction AD2, opposite the axial direction AD1, to an open position for clutch 400 in which impeller shell 410 is rotatable with respect to the cover.

In an example embodiment, element 418 is a diaphragm spring or a bi-stable resilient element. The discussion regarding element 218 as a bi-stable element is applicable to element 418.

In an example embodiment, the impeller clutch includes radial extension 410A of the impeller shell; backing plate or piston engagement member 424 non-rotatably connected to the cover and extending substantially radially inward from and non-rotatable relative to outer wall 404C and being spaced between opposite sidewalls 404A and 404B, and friction material 426 located between the extension 410A and the cover. Backing plate or piston engagement member 424 includes first engagement surface 424A. Turbine 408, also referred to as turbine-piston 408, is coaxially aligned with and hydrodynamically drivable by impeller 406; turbine-piston 408 comprising turbine-piston shell or turbine shell 414 including a turbine-piston flange or radial extension 414A having second engagement surface 414B axially movable toward and away from first engagement surface 424A of backing plate or piston engagement member 424 to position the hydrokinetic torque coupling device into and out of a lockup mode in which the turbine-piston is mechanically locked to and non-rotatable relative to backing plate or piston engagement member 424. In the closed position for the impeller clutch, extension 410A, friction material 426, and plate 424 are engaged.

In an example embodiment, the multi-function torque converter includes torque converter clutch 427 with radial extension 414A of shell 414. Pressure chamber 430 is at least partially formed by the cover and the turbine shell. Clutch 427 is arranged to connect the cover to the turbine shell and by-pass the fluid connection between the turbine shell and the impeller shell. That is, torque flows from the cover directly to the turbine shell through the torque converter clutch. Fluid circuit 432 is arranged to provide pressurized fluid to pressure chamber 420 to displace the impeller shell in direction AD2 to open clutch 400 such that the impeller shell is rotatable with respect to the cover. Fluid circuit 434 is arranged to provide pressurized fluid to pressure chamber 430 to close the torque converter clutch to connect the cover to the turbine shell.

Advantageously, circuit 434 is the only fluid circuit in the torque converter used in the closing of the impeller clutch and the torque converter clutch. Specifically, since element 418 is used to close impeller clutch 400, it is not necessary to supply pressurized fluid to close clutch 400. Thus, the pressure bandwidth problem and the efficiency and energy requirement problems for the hydraulic system, noted above, are eliminated.

In an example embodiment, the multi-function torque converter includes stator 436. In an example embodiment, the multi-function torque converter includes vibration damper, vibration damper assembly, or damper assembly 438 interconnecting turbine-piston 408 and output hub 450. Drive member 452 interconnects turbine-piston shell 414 to damper assembly 438, drive member 452 being axially and rotatably fixed relative to turbine-piston shell 414 and axially movable with turbine-piston relative 408 to damper assembly 438.

In an example embodiment, the impeller shell includes passageway 440 through the material forming the impeller shell, wholly surrounded by the material, and opening to pressure chamber 420 and torus 442 formed by the impeller and the turbine. Passageway 440 provides flow path 444 between the torus and pressure chamber 420.

In torque converter mode (clutch 400 is closed and clutch 427 is open), fluid pressure in circuit 432 and chamber 420 is low, fluid pressure in circuit 434 and chamber 430 is low, and element 418 urges clutch 400 closed. Flow in flow path 444 is from chamber 420 to the torus. Fluid pressure in the torus is equal to or greater than fluid pressure in chamber 430. For torque converter clutch mode, fluid pressure in circuit 432 and chamber 420 is high to open clutch 400. Fluid pressure in circuit 434 and chamber 430 is increased to a high value to non-rotatably engage extension 414A, friction material 426, and cover 404. Pressure in chamber 430 is higher than pressure in torus 442 and flow path 444 is from chamber 420 to the torus. Fluid drains from the torus though passive fluid circuit 446. In idle disconnect mode (clutches 400 and 427 each open), pressure in fluid circuit 432 and chamber 420 is increased to a high value to open clutch 400 and fluid pressure in circuit 434 and chamber 430 is equal to or lower than pressure in the torus to open clutch 427. Flow in flow path 444 is from chamber 420 to the torus. Fluid also flows between extension 414A and the cover into chamber 430. To open clutch 427, fluid pressure in fluid circuit 434 and chamber 430 is lowered and fluid pressure in torus 442 is increased via fluid circuit 432, chamber 420, and passageway 440.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A multi-function torque converter, comprising:
   a cover rotatable about a rotational axis and comprising opposite first and second sidewalls, the cover further comprising an outer wall extending between and interconnecting the opposite sidewalls;
   an impeller coaxially aligned with the rotational axis and comprising an impeller shell;
   a backing plate extending radially inward from and non-rotatable relative to the outer wall of the cover and being spaced between the opposite sidewalls of the cover, the backing plate having a first engagement surface; and,
   a turbine-piston coaxially aligned with and hydrodynamically drivable by the impeller, the turbine-piston comprising a turbine shell including a radial extension having a second engagement surface axially movable toward and away from the first engagement surface of the backing plate to position the torque converter into and out of a lockup mode in which the turbine-piston is mechanically locked to and non-rotatable relative to the backing plate.

2. The multi-function torque converter of claim 1, wherein the turbine-piston is axially movable towards an input side of the multi-function torque converter in order to frictionally couple the first and second engagement surfaces and position the multi-function torque converter in the lockup mode, and wherein the turbine-piston is axially movable towards an output side of the multi-function torque converter so that the first and second engagement surfaces are not frictionally coupled and the hydrokinetic torque coupling device is not in the lockup mode.

3. The multi-function torque converter of claim 1, further comprising: an output hub; and a vibration damper assembly interconnecting the turbine-piston and the output hub.

4. The multi-function torque converter of claim 3, further comprising a drive member interconnecting the turbine shell to the vibration damper assembly, the drive member being axially and rotatably fixed relative to the turbine shell and axially movable with the turbine-piston relative to the vibration damper assembly.

5. The multi-function torque converter of claim 3, wherein the turbine shell partitions an interior volume of the multi-function torque converter into a torus chamber and a damper chamber, the torus chamber containing impeller blades of the impeller and turbine blades of the turbine-piston, the damper chamber containing the vibration damper assembly.

6. The multi-function torque converter of claim 1, wherein the backing plate is welded to and extends radially inward from an inner peripheral surface of the outer wall of the casing.

7. The multi-function converter of claim 1, further including an impeller clutch including a resilient element:
   urging the impeller shell toward the cover to close the impeller clutch; and,
   including at least a portion located radially inward of the at least one impeller.

8. A hydrokinetic torque coupling device for coupling a driving shaft and a driven shaft together, comprising:
   a casing rotatable about a rotational axis and comprising opposite first and second sidewalls, the casing further comprising an outer wall extending between and interconnecting the opposite sidewalls;
   an impeller coaxially aligned with the rotational axis and comprising an impeller shell;
   a piston engagement member extending substantially radially inward from and non-rotatable relative to the outer wall of the casing and being spaced between the opposite sidewalls of the casing, the piston engagement member having a first engagement surface; and,
   a turbine-piston coaxially aligned with and hydrodynamically drivable by the impeller, the turbine-piston comprising a turbine-piston shell including a turbine-piston flange having a second engagement surface axially movable toward and away from the first engagement surface of the piston engagement member to position the hydrokinetic torque coupling device into and out of a lockup mode in which the turbine-piston is mechanically locked to and non-rotatable relative to the piston engagement member.

\* \* \* \* \*